US008154760B2

(12) United States Patent  
Satoh

(10) Patent No.: US 8,154,760 B2
(45) Date of Patent: Apr. 10, 2012

(54) IMAGE FORMING APPARATUS, CONTENT DISPLAY METHOD, AND COMPUTER PROGRAM PRODUCT

(75) Inventor: Shohichi Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1103 days.

(21) Appl. No.: 11/933,698

(22) Filed: Nov. 1, 2007

(65) Prior Publication Data

US 2008/0130033 A1 Jun. 5, 2008

(30) Foreign Application Priority Data

Nov. 30, 2006 (JP) ................................. 2006-324725
Sep. 13, 2007 (JP) ................................. 2007-237750

(51) Int. Cl.
*H04N 1/04* (2006.01)
(52) U.S. Cl. ......... 358/1.4; 358/1.14; 358/1.15; 358/1.1
(58) Field of Classification Search .................. 358/1.14, 358/1.1, 1.15, 1.4
See application file for complete search history.

(56) References Cited

U.S. PATENT DOCUMENTS

| 6,317,783 | B1 * | 11/2001 | Freishtat et al. ............... 709/218 |
| 6,631,186 | B1 * | 10/2003 | Adams et al. ............. 379/201.12 |
| 6,871,213 | B1 * | 3/2005 | Graham et al. ................ 709/205 |
| 2003/0051215 | A1 | 3/2003 | Nakao |

FOREIGN PATENT DOCUMENTS

| CN | 1406047 A | 3/2003 |
| EP | 1 292 101 A2 | 3/2003 |
| JP | 3679349 | 5/2005 |

OTHER PUBLICATIONS

Chinese Office Action issued Mar. 2, 2011, in Patent Application No. 200710196235.2 (with English-language translation).
U.S. Appl. No. 12/254,396, filed Oct. 20, 2008, Satoh.

* cited by examiner

*Primary Examiner* — Houshang Safaipour
(74) *Attorney, Agent, or Firm* — Oblon, Spivak, McClelland, Maier & Neustadt, L.L.P.

(57) ABSTRACT

An operation display unit displays an operation screen for receiving input. A first storage unit stores therein a file that contains a definition of a screen described in a markup language, and a compound content that contains a still image and a moving image. A browser unit displays a markup content based on the definition on the operation screen by executing the file. A displaying unit displays the compound content on the operation screen. A control unit controls switch between display of the markup content and display of the compound content on the operation screen.

20 Claims, 19 Drawing Sheets

IMAGE FORMING APPARATUS, CONTENT DISPLAY METHOD, AND COMPUTER PROGRAM PRODUCT

CROSS-REFERENCE TO RELATED APPLICATIONS

The present application claims priority to and incorporates by reference the entire contents of Japanese priority document, 2006-324725 filed in Japan on Nov. 30, 2006 and 2007-237750 filed in Japan on Sep. 13, 2007.

BACKGROUND OF THE INVENTION

1. Field of the Invention

The present invention generally relates to a technology for displaying a content on a display unit.

2. Description of the Related Art

Software (application) has been uniquely developed for displaying specific information on a display screen of an image forming apparatus. For example, Japanese Patent No. 3679349 discloses an image forming apparatus on which is installed some types of software each corresponding to, for example, a printer, a copier, or a facsimile machine. The software is efficiently implemented and the productivity of the image forming apparatus can be enhanced. In the image forming apparatus, display on an operation screen of an operation panel is generally based on data that is originally stored in, for example, a read only memory (ROM) and that is generated by software of the image forming apparatus.

However, such uniquely-developed software cannot be customized by a third vender, which makes it difficult to change display on the operation screen and is inconvenient to a user.

SUMMARY OF THE INVENTION

It is an object of the present invention to at least partially solve the problems in the conventional technology.

According to an aspect of the present invention, an image forming apparatus includes an display unit that displays an operation screen, and that receives input through the operation screen; a first storage unit that stores therein a markup file that contains a definition of a screen described in a markup language, and a first content that contains at least a still image; a browser unit that executes the markup file to create the screen on the operation screen according to the definition, and displays the screen as a second content; a displaying unit that displays the first content on the operation screen; and a control unit that controls switch between the second content and the first content displayed on the operation screen.

According to another aspect of the present invention, a content display method includes displaying an operation screen to receive input through the operation screen; storing a markup file that contains a definition of a screen described in a markup language, and a first content that contains at least a still image; executing the markup file to create the screen on the operation screen according to the definition; displaying the screen as a second content on the operation screen; displaying the first content on the operation screen; and performing switch between the second content and the first content displayed on the operation screen.

According to still another aspect of the present invention, a computer program product includes a computer usable medium having computer readable program codes embodied in the medium that, when executed, cause a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. Although an image forming apparatus according to the embodiments can be, for example, a printer, a copier, or a facsimile machine, it is explained below as a multifunction product (MFP) that combines any or all of the functions of these.

Figure 1:
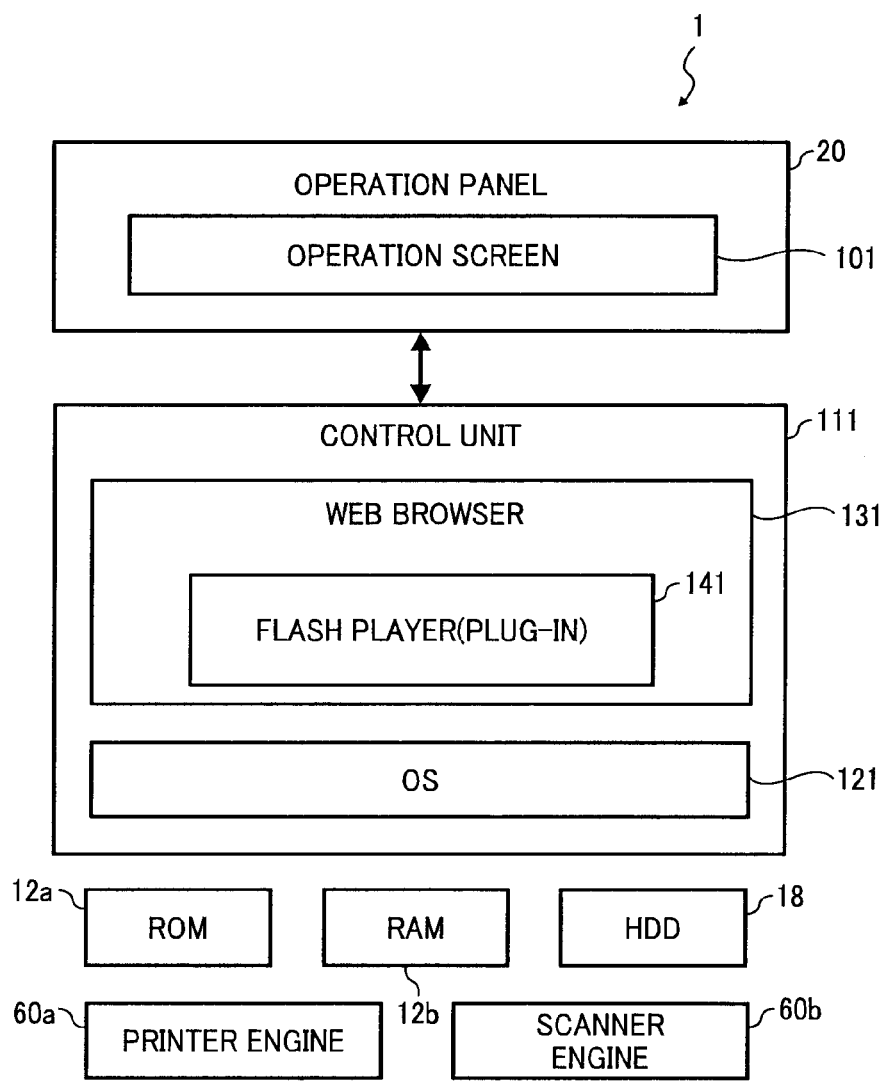
FIG. 1 is a block diagram of an image forming apparatus according to a first embodiment of the present invention.

FIG. 1 is a block diagram of an MFP 1 according to a first embodiment of the present invention. The MFP 1 includes an operation panel (touch panel) 20, a control unit 111, a read only memory (ROM) 12a, a random access memory (RAM) 12b, a hard disk drive (HDD) 18, a printer engine 60a, and a scanner engine 60b. The operation panel 20 is, for example, a liquid crystal display panel that displays an operation screen 101 displaying operation keys or buttons. The control unit 111 controls display on the operation screen 101, and includes an operation system (OS) 121 and a web browser 131 that runs on the OS 121.

The web browser 131 creates a browser screen as a hyper-text markup language (HTML) content based on an HTML file (a markup file), in which a definition of the browser screen is described in a markup language such as HTML, to display the HTML content (a markup content) thereon. The HTML content is stored in the ROM 12a. The HTML content (hereinafter, "internal HTML content") is read from the ROM 12a as required to be displayed by the web browser 131.

In addition to the internal HTML content, the web browser 131 displays a flash content and an HTML content received from an external device via a network (hereinafter, "external flash content" and "external HTML content") on the browser screen.

The web browser 131 includes a flash player 141 as a plug-in. The flash player 141 displays a flash content. The flash content is, for example, a compound content that contains various types of contents such as a still image and a moving image. The flash content is stored in the ROM 12a. The flash content (hereinafter, "internal flash content") is read from the ROM 12a as required to be displayed by the flash player 141.

The RAM 12b temporarily stores therein the HTML content and the flash content to be displayed on the operation screen 101. According to the first embodiment, when a content being displayed on the operation screen 101 is changed, the content stored in the RAM 12b is deleted.

Because display on the operation screen 101 is based on a general HTML content and a general flash content, customization of display can be facilitated.

A flash content can contain an audio content. In this case, the flash player 141 is capable of audio output.

Figure 2:
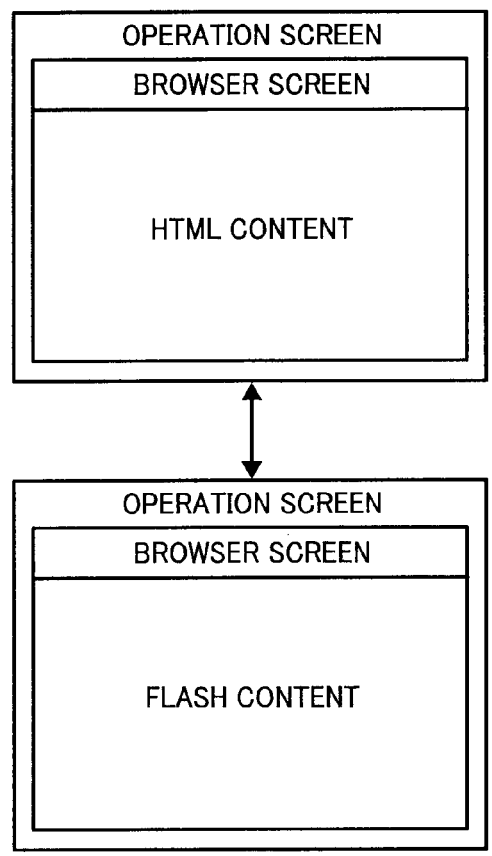
FIG. 2 is a schematic diagram of an operation screen shown in FIG. 1 for explaining transition of display thereon.

FIG. 2 is a schematic diagram for explaining an example of transition of display on the operation screen 101. The display is controlled by the control unit 111. Specifically, the control unit 111 controls the web browser 131 to change a content to be displayed among the internal HTML content, the external HTML content, the external flash content, and the internal flash content.

Each HTML content (an internal HTML content or an external HTML content) is displayed on a browser screen that the web browser 131 has generated on the operation screen 101. Each flash content (an internal flash content or an external flash content) is displayed by the flash player 141 on a browser screen that the web browser 131 has generated.

The display is changed by a content-change instruction issued by a user. For example, a content-change button is displayed on the operation screen 101, and the user can issue the content-change instruction by selecting the content-change button. Alternatively, a hardware key can be provided to a chassis of the MFP 1, and the user can issue the content-change instruction by selecting the hardware key.

Figure 3:
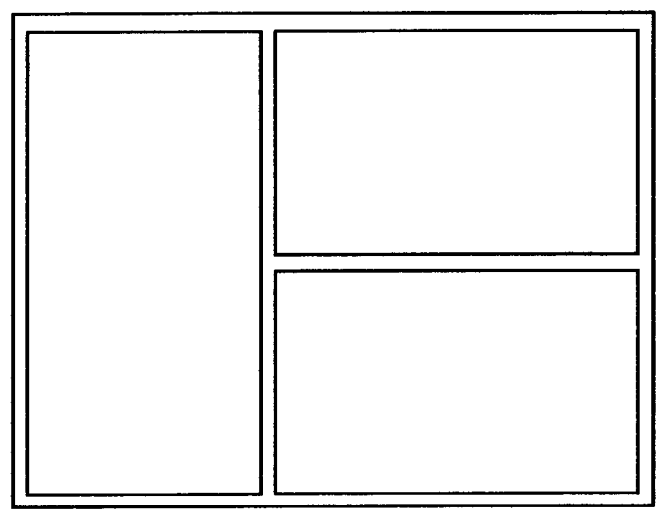
FIG. 3 is an example of an HTML content displayed on the operation screen.

FIG. 3 is an example of an HTML content displayed on the operation screen 101. For example, a setting screen for an administrator is generated based on an HTML content. For example, the administrator can order consumable supplies via the Internet by use of the HTML content, which improves the convenience of the administrator.

Figure 4:
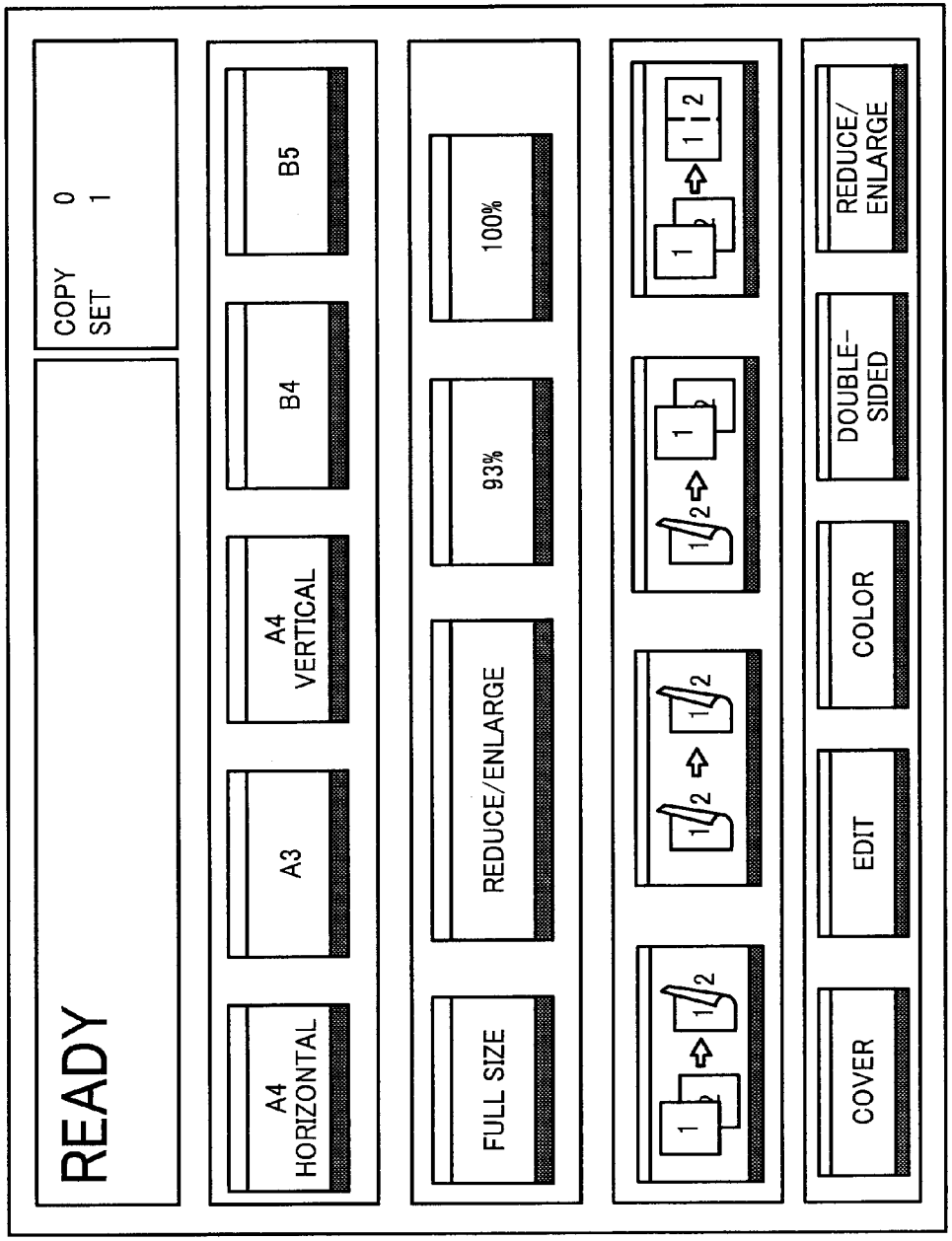
FIG. 4 is an example of an HTML content displayed on the operation screen in default.
Figure 5:
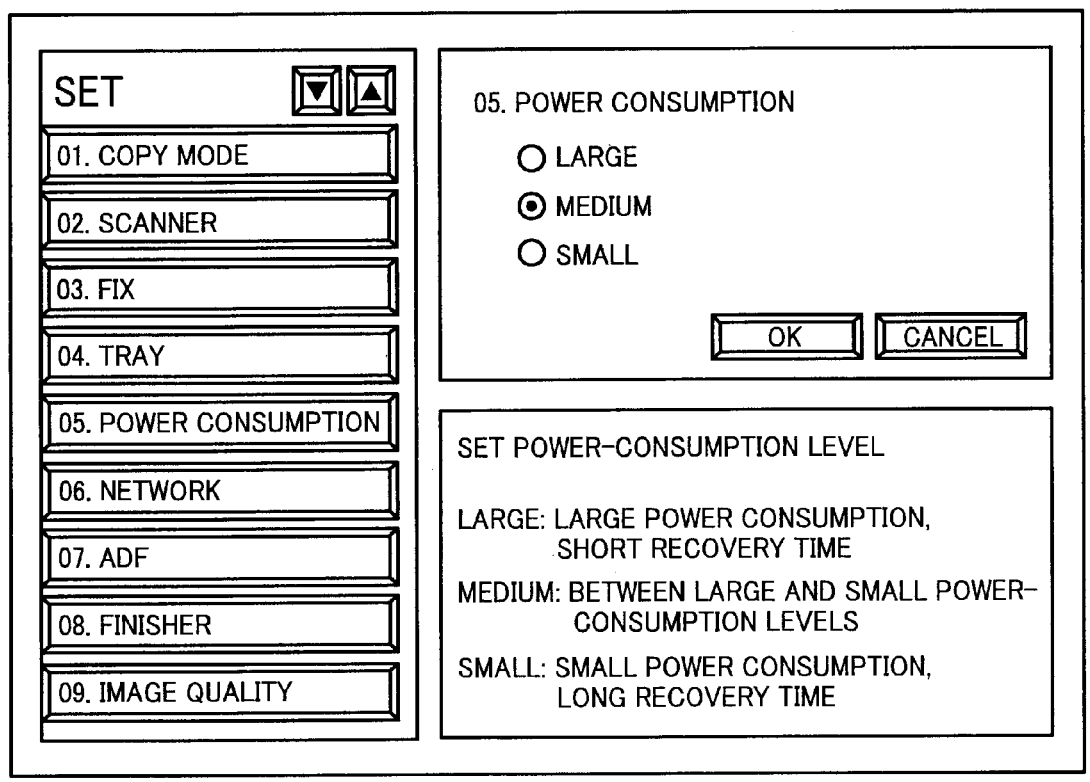
FIG. 5 is an example of display of an HTML content obtained by customizing the operation screen shown in FIG. 4.

FIG. 4 is an example of an HTML content displayed on the operation screen 101 as an initial screen. FIG. 5 is an example of an HTML content displayed on the operation screen 101 as an initial screen obtained by customizing the initial screen shown in FIG. 4. According to the first embodiment, because an HTML content and a flash content is displayed on the operation screen 101, customization of display can be facilitated.

Figure 6:
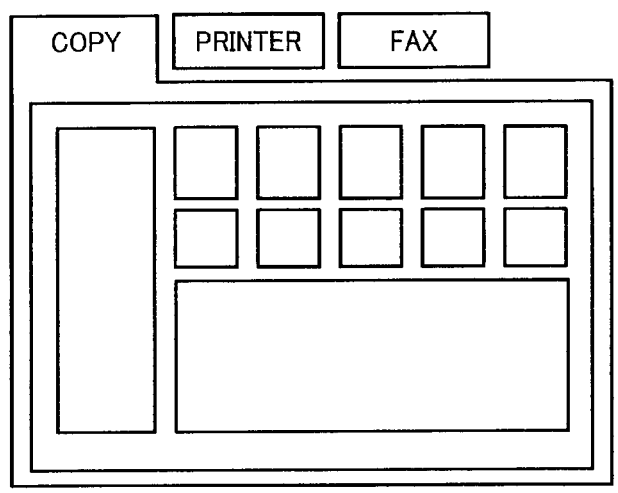
FIG. 6 is an example of a flash content.

FIG. 6 is an example of a flash content (an internal flash content or an external flash content). For example, an internal flash content, i.e., a relatively rich content, is displayed on the operation screen 101 for a user, which improves the operability for the user. Because a flash content requires a larger number of processes, an HTML content that requires a smaller number of processes is displayed on the operation screen 101 for a specific user such as the administrator, so that the number of processes can be reduced.

Figure 7:
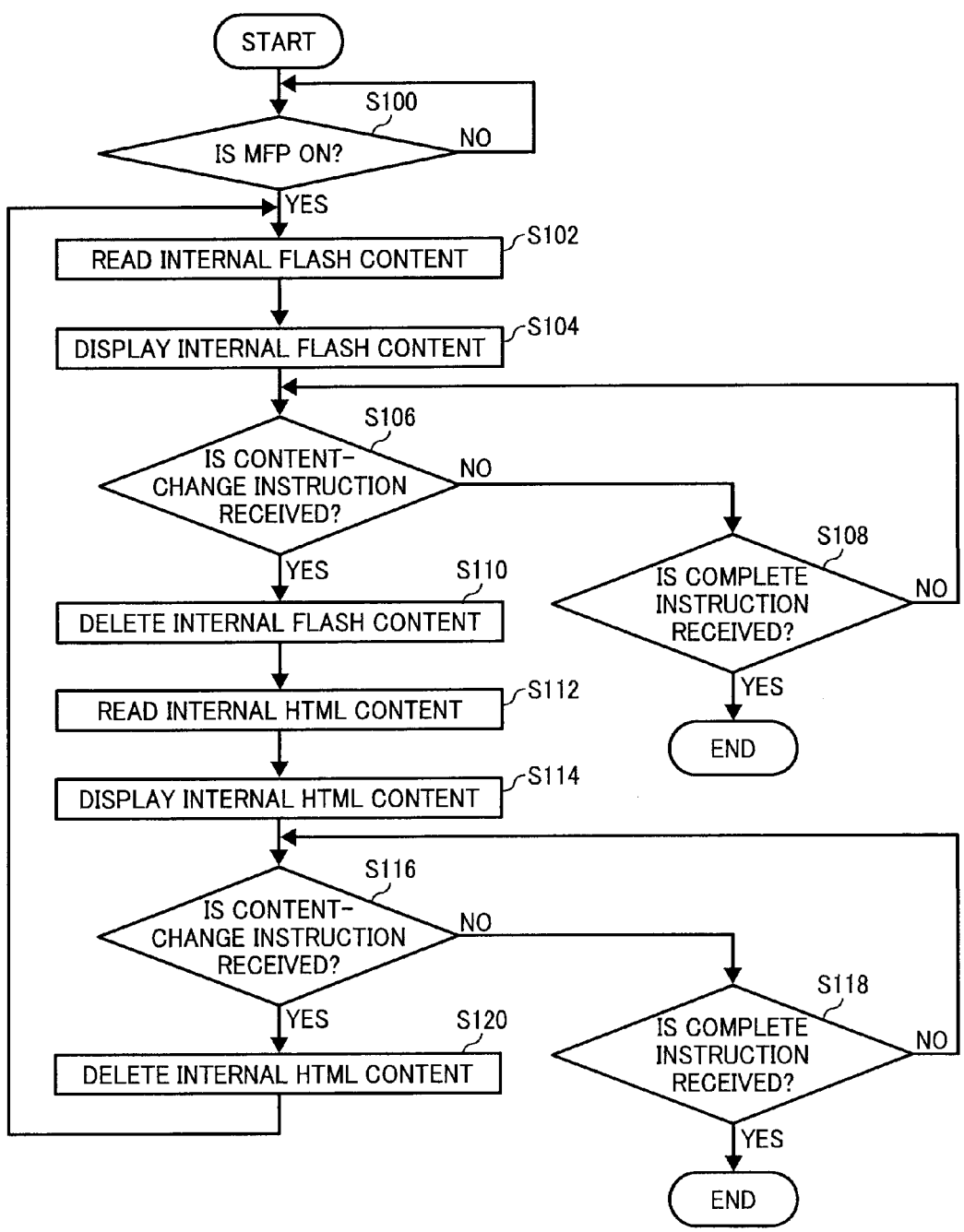
FIG. 7 is a flowchart of a content-display process according to the first embodiment.

FIG. 7 is a flowchart of a process for displaying an internal flash content and an internal HTML content performed by the MFP 1. Similarly, the process is performed to display an external flash content and an external HTML content. After the MFP 1 is turned ON (YES at step S100), the flash player 141 reads an internal flash content from the ROM 12a (step S102). Subsequently, the flash player 141 displays the internal flash content on the operation screen 101 (step S104).

After the control unit 111 receives a content-change instruction from a user (YES at step S106), the web browser 131 deletes the internal flash content currently being displayed (step S110). Thereafter, the web browser 131 reads an internal HTML content (step S112), and displays the HTML content on the operation screen 101 (step S114).

When the control unit 111 receives no content-change instruction from the user (NO at step S106), and receives an instruction for completing the display (hereinafter, "complete instruction") (YES at step S108), the control unit 111 completes the process. On the other hand, when no complete instruction is received (NO at step S108), the process control goes back to step S106 and the control unit 111 waits for an input of a content-change instruction.

When the control unit 111 receives a content-change instruction from the user while the internal HTML content displayed at step S114 is being displayed (Yes at step S116), the internal HTML content is deleted (step S120). Thereafter, the process control goes back to step S102, and the flash player reads the internal HTML flash content again.

When the control unit 111 receive no content-change instruction (No at step S116) and receives a complete instruction (YES at step S118), the control unit 111 completes the process. On the other hand, when no complete instruction is received (NO at step S118), the process control goes back to step S116 and the control unit 111 waits for an input of a content-change instruction.

As described above, according to the first embodiment, the rich flash content is displayed on the screen for a user, which improves the operability for the user. In addition, because the HTML content is displayed on the screen for an administrator, less cost is required than the case where all displays are created based on flash contents.

Figure 8:
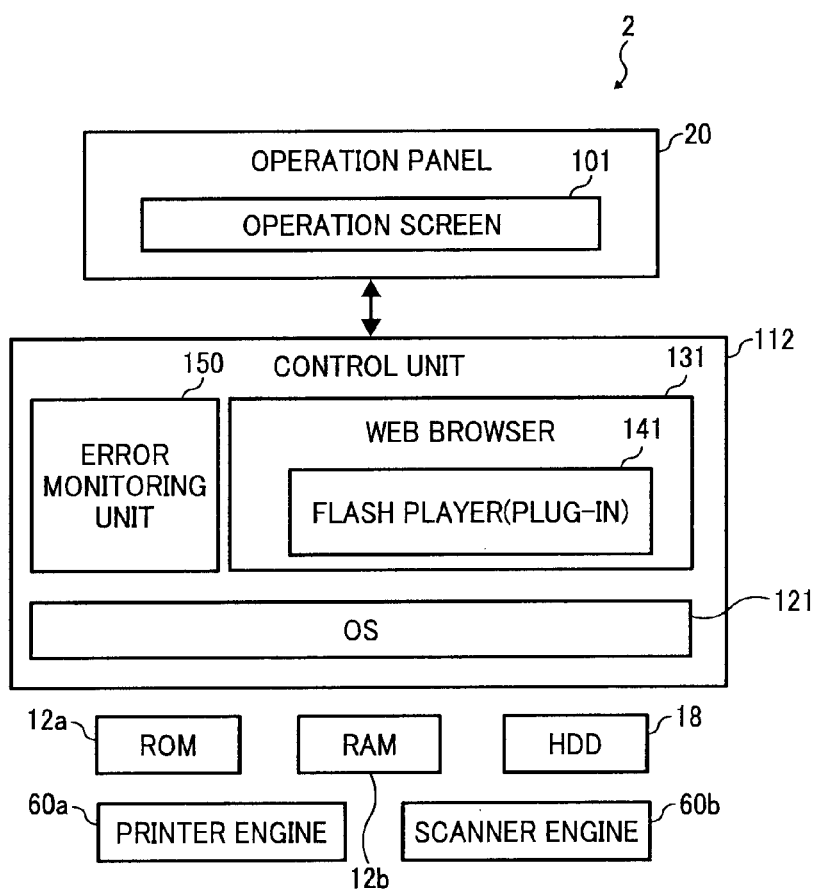
FIG. 8 is a block diagram of an image forming apparatus according to a second embodiment of the present invention.

FIG. 8 is a block diagram of an MFP 2 according to a second embodiment of the present invention. The MFP 2 is of basically the same configuration and operates in the same manner as the MFP 1 except for a control unit 112 that controls display on the operation screen 101, and therefore, the same explanation is not repeated.

The control unit 112 includes, in addition to the OS 121, the flash player 141 as a plug-in, and the web browser 131, an error monitoring unit 150. The error monitoring unit 150 monitors an error in the process performed by the MFP 2. When an error occurs, the error monitoring unit 150 notifies the OS 121 of the error.

Figure 9:
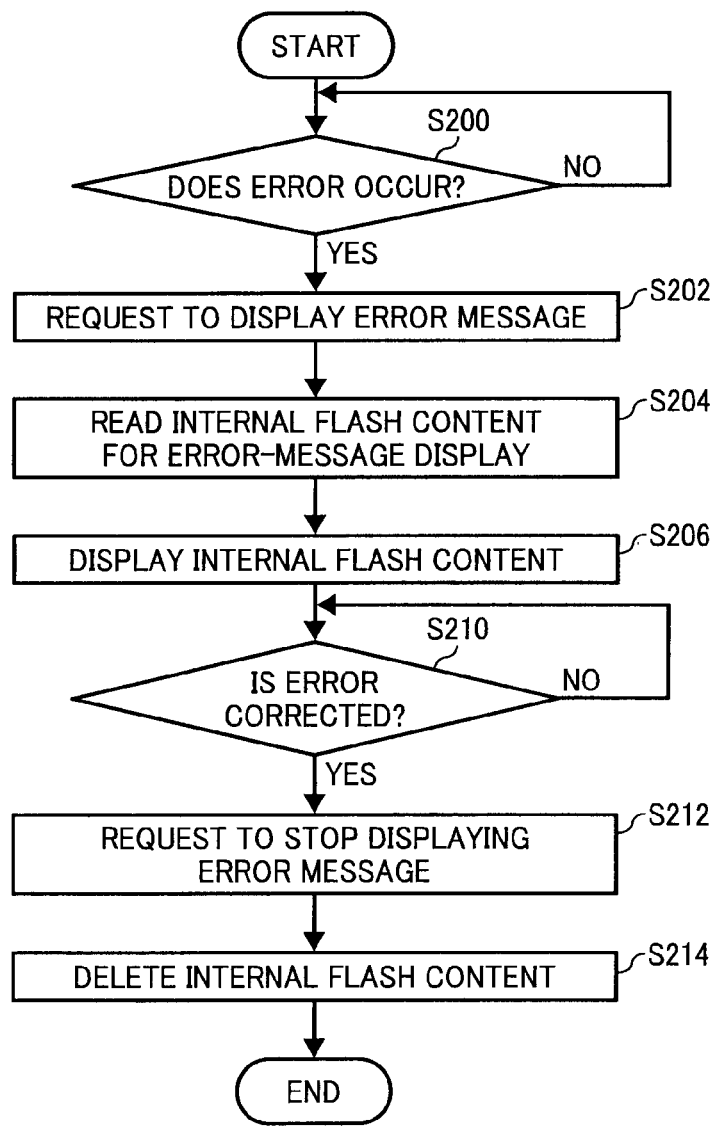
FIG. 9 is a flowchart of a content-display process according to the second embodiment performed when an error occurs.

FIG. 9 is a flowchart of a process for displaying an internal flash content and an internal HTML content performed by the MFP 2 when an error occurs. Similarly, the process is performed to display an external flash content and an external HTML content. After the error monitoring unit 150 detects an error (YES at step S200), the error monitoring unit 150 issues a request for displaying an error message (step S202). Upon receipt of the request via the OS 121, the flash player 141 reads an internal flash content for displaying an error message (step S204). Thereafter, the flash player 141 displays the internal flash content (step S206).

Figure 10:
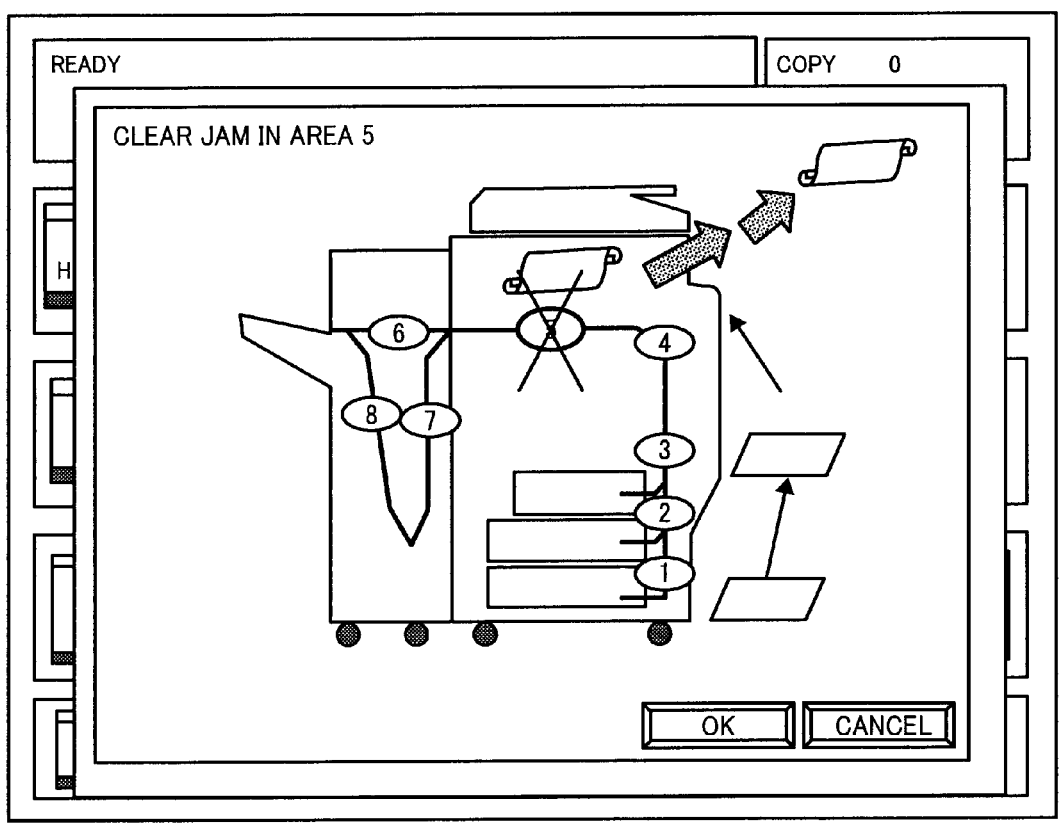
FIG. 10 is an example of a flash content displayed as an error display.

FIG. 10 is an example of a flash content displayed on the operation screen 101 as an error display. A flash content is used for error display because, when a browser screen of an HTML content is displayed, a browser screen of a content other than the HTML content cannot be displayed unless a user issues a request on the browser screen for a change of the browser screen being displayed, or display of another browser screen. In other words, even when an error occurs, the HTML content cannot be automatically displayed as an error display without operation by a user. On the other hand, a flash content can be automatically displayed on the operation screen 101 as an error display without the operation by a user. In addition, with a moving image, for example, a portion of the display blinking to indicate a position where an error occurs as shown in FIG. 10, the user can easily recognize the position and type of the error.

After detecting that the error is corrected (YES at step S210), the error monitoring unit 150 issues a request for stop displaying the error message (step S212). Upon receipt of the request via the OS 121, the flash player 141 stops displaying the error message, and deletes the internal flash content (step S214).

According to the second embodiment, because the flash content is displayed on the operation screen 101 as error display when an error occurs, a user can be quickly notified of the occurrence of the error, which improves the operability for the user.

Figure 11:
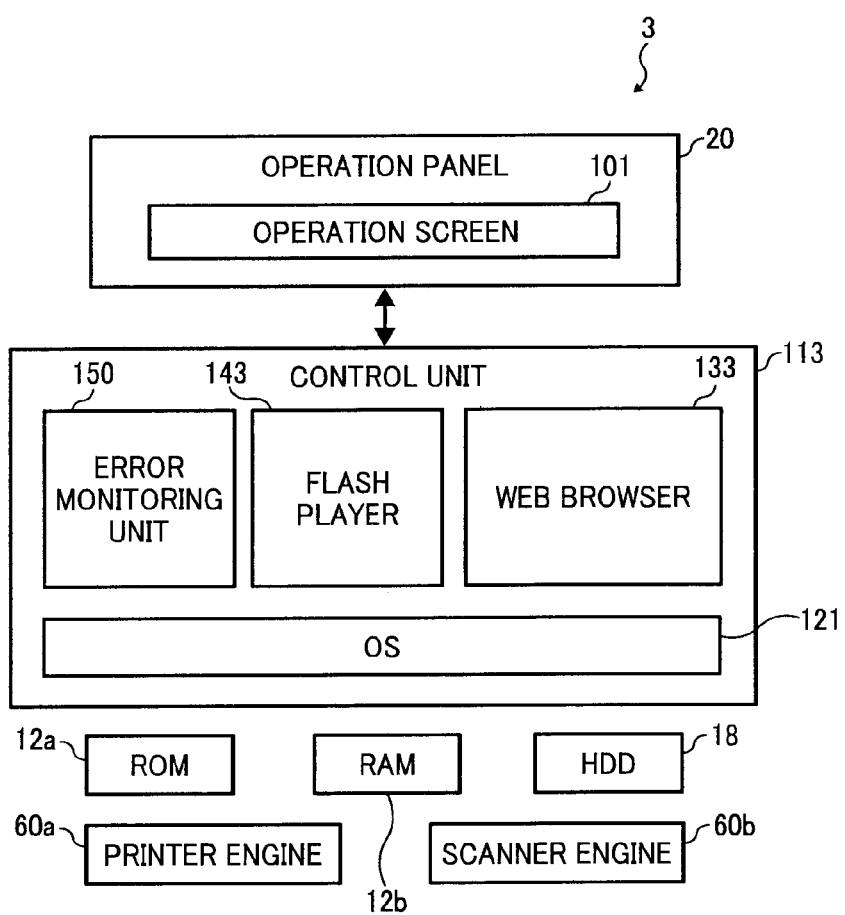
FIG. 11 is a block diagram of an image forming apparatus according to a third embodiment of the present invention.

FIG. 11 is a block diagram of an MFP 3 according to a third embodiment of the present invention. The MFP 3 is of basically the same configuration and operates in the same manner as the MFP 2 except for a control unit 113 that controls display on the operation screen 101, and therefore, the same explanation is not repeated.

The control unit 113 includes the OS 121, a web browser 133, a flash player 143, and the error monitoring unit 150.

The web browser 133 generates a browser screen on the operation screen 101 and displays an internal HTML content and an external HTML content on the browser screen. The flash player 143 is provided independently of the web browser 133 (not as a plug-in of the web browser 133), and displays an internal flash content and an external flash content.

Figure 12:
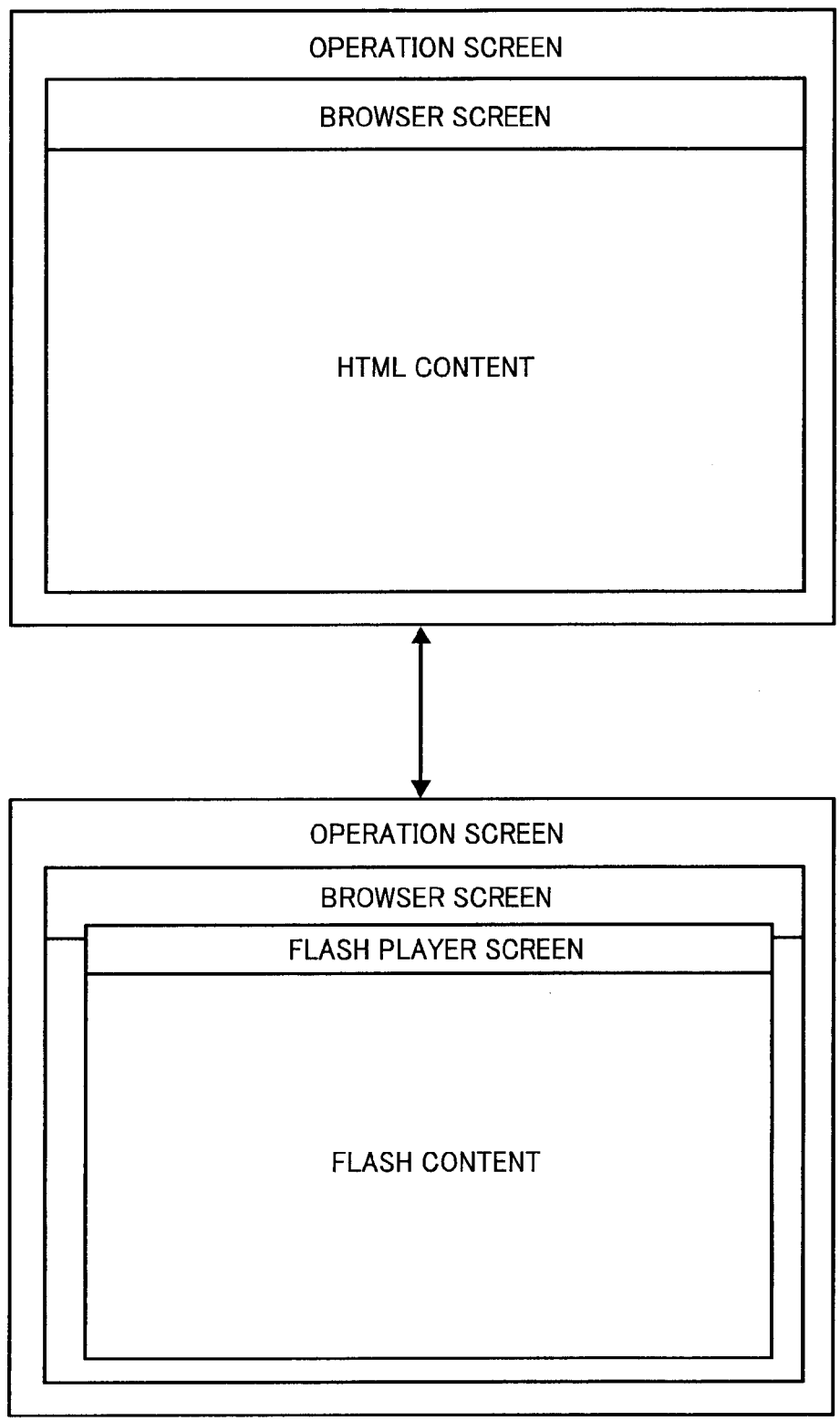
FIG. 12 is a schematic diagram of an operation screen shown in FIG. 11 for explaining transition of display on the operation screen.

FIG. 12 is a schematic diagram for explaining an example of transition of display on the operation screen 101 controlled by the control unit 113. The control unit 113 changes display among an internal HTML content, an external HTML content, an external flash content, and an internal flash content.

An HTML content (an internal HTML content or an external HTML content) is displayed on a browser screen generated on the operation screen 101 by the web browser 133. When the display of an HTML content is changed to the display of a flash content (an internal flash content or an external flash content), the flash player 143 displays a flash player screen on the browser screen as a pop-up screen, and displays the flash content on the flash player screen.

Figure 13:
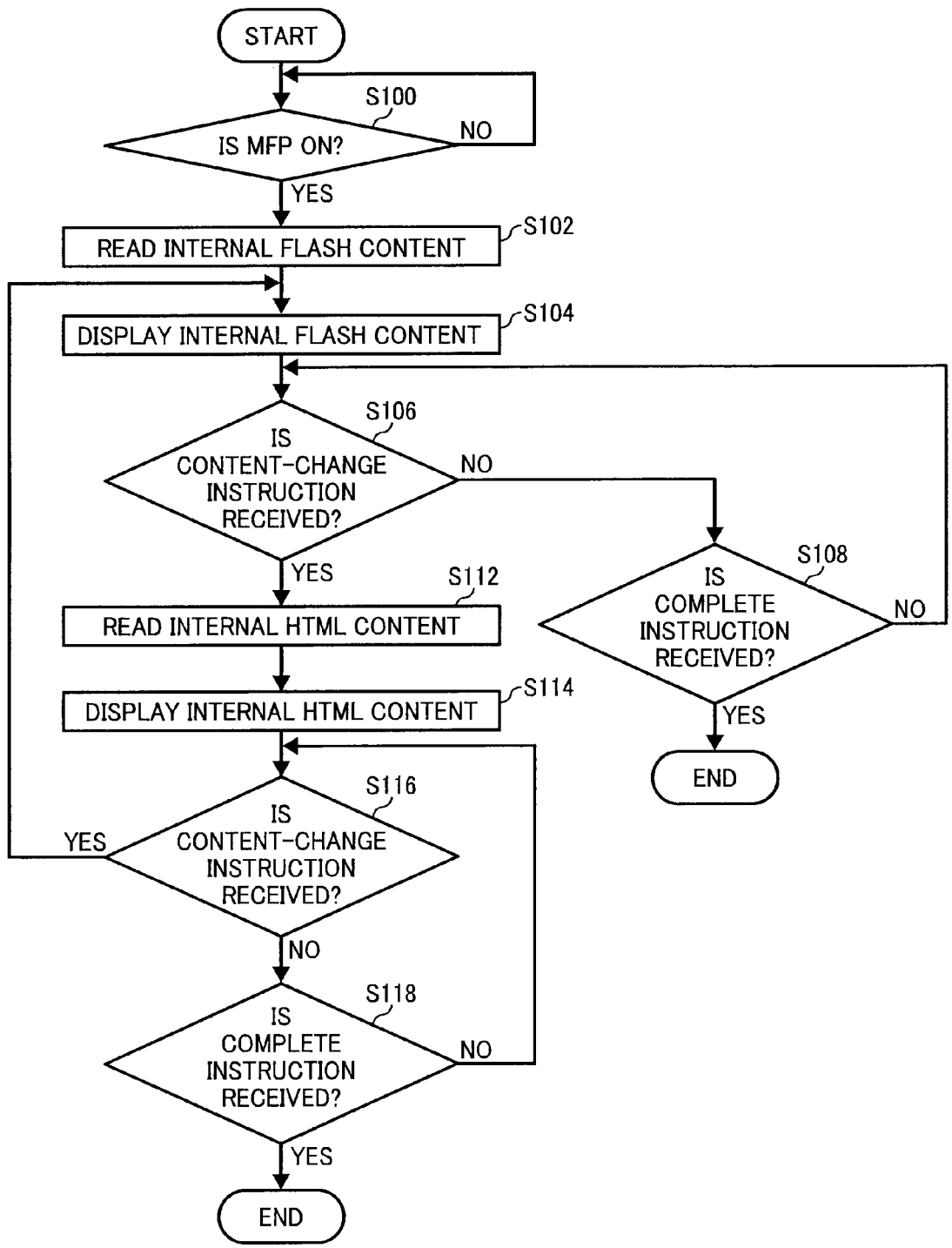
FIG. 13 is a flowchart of a content-display process according to the third embodiment.

FIG. 13 is a flowchart of a process for displaying an internal flash content and an internal HTML content performed by the MFP 3. Similarly, the process is performed to display an external flash content and an external HTML content. Different from other embodiments, according to the third embodiment, an internal flash content is displayed by the flash player 143 independent of the web browser 133. For this reason, after the control unit 113 receives a content-change instruction for changing the internal flash content currently displayed to an internal HTML content, the internal HTML content can be displayed while the internal flash content is kept stored (not deleted) in the RAM 12b.

Specifically, when the control unit 113 receives the content-change instruction from the user after the internal flash content is displayed at step 104 (YES at step S106), the internal flash content being displayed is not deleted. The web browser 133 reads an internal HTML content (step S112) and displays the HTML content on the operation screen 101 (step S114).

When the control unit 113 receives a content-change instruction from the user while the internal HTML content is displayed (YES at step S116), the process control goes back to step S104 and the internal flash content is displayed again (step S104). Because the internal flash content is stored in the RAM 12b, it is not required to read the flash content from the ROM 12a again.

Figure 14:
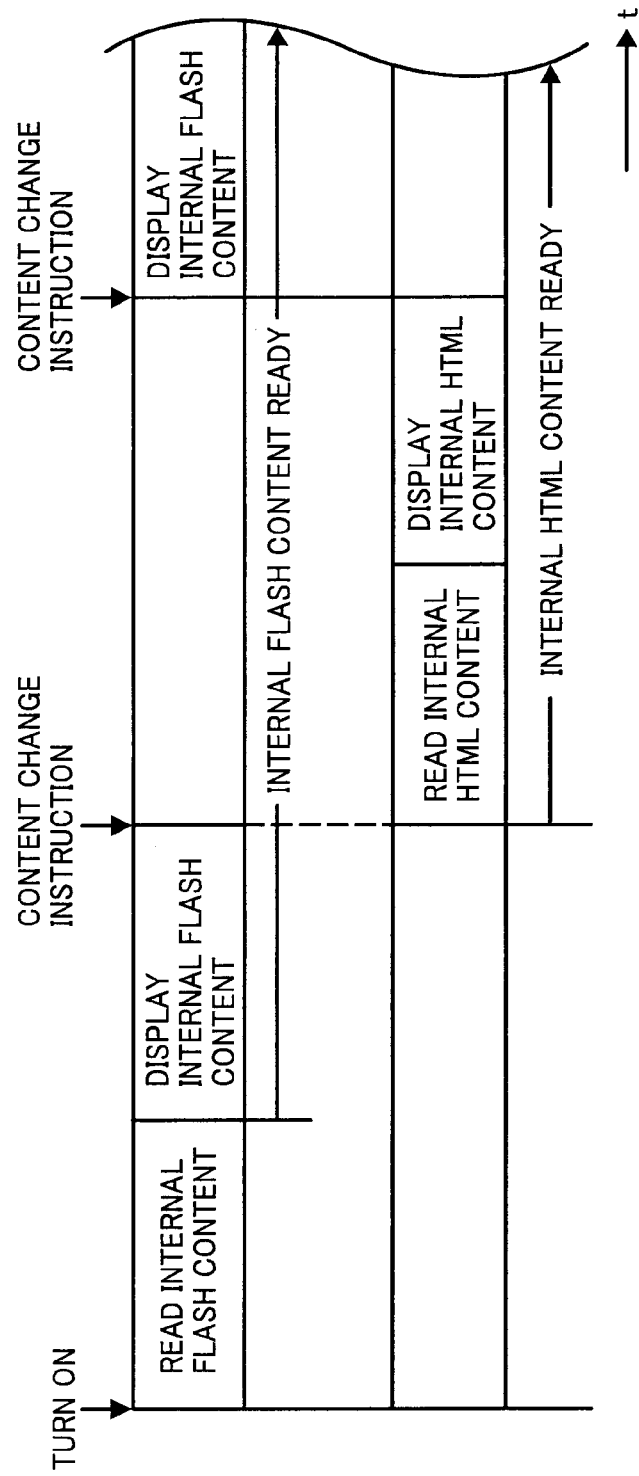
FIG. 14 is a schematic diagram for chronologically explaining the content-display process shown in FIG. 13.

FIG. 14 is a schematic diagram for chronologically explaining the process explained above with reference to FIG. 13. After being read from the ROM 12a, the internal flash content is ready for display. Even when an internal HTML content is read from the ROM 12a, the internal flash content is not deleted from the RAM 12b. That is, once read from the ROM 12a, the internal flash content is kept stored in the RAM 12b. Therefore, when the internal HTML content is changed to the internal flash content, the internal flash content stored in the RAM 12b can be displayed without re-reading of the internal flash content from the ROM 12a, which shorten the time required for displaying the internal flash content.

Figure 15:
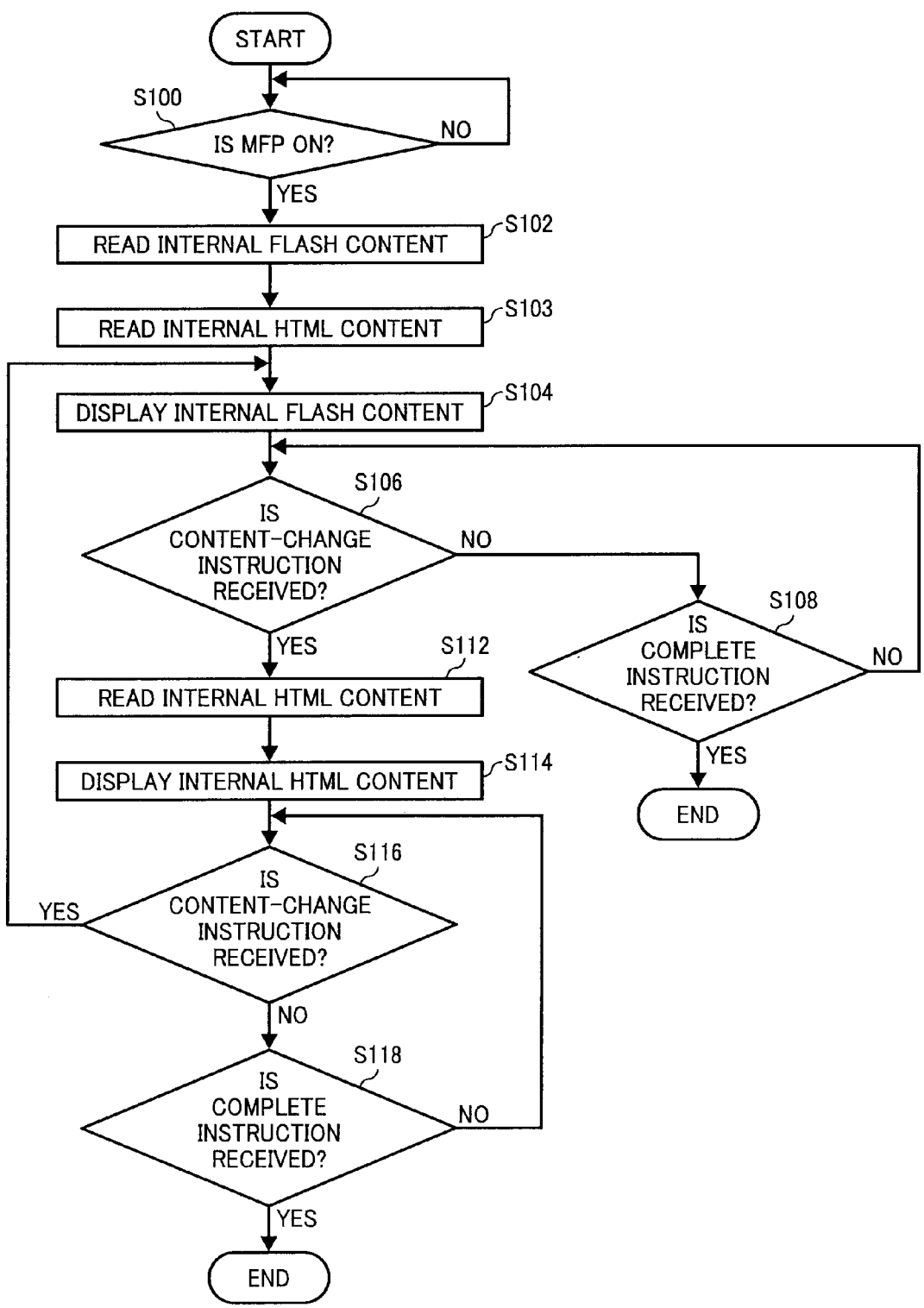
FIG. 15 is a flowchart of another content-display process according to the third embodiment.

FIG. 15 is a flowchart of another process performed by the MFP 3. The MFP 3 can read not only the internal flash content but also the internal HTML content from the ROM 12a when turned ON. Specifically, the flash player 143 reads an internal flash content (step S102), and also an internal HTML content from the ROM 12a (step S103). Subsequently, the flash player 143 displays the internal flash content on the operation screen 101 (step S104). Any of the internal flash content and the internal HTML content can be read first.

Figure 16:
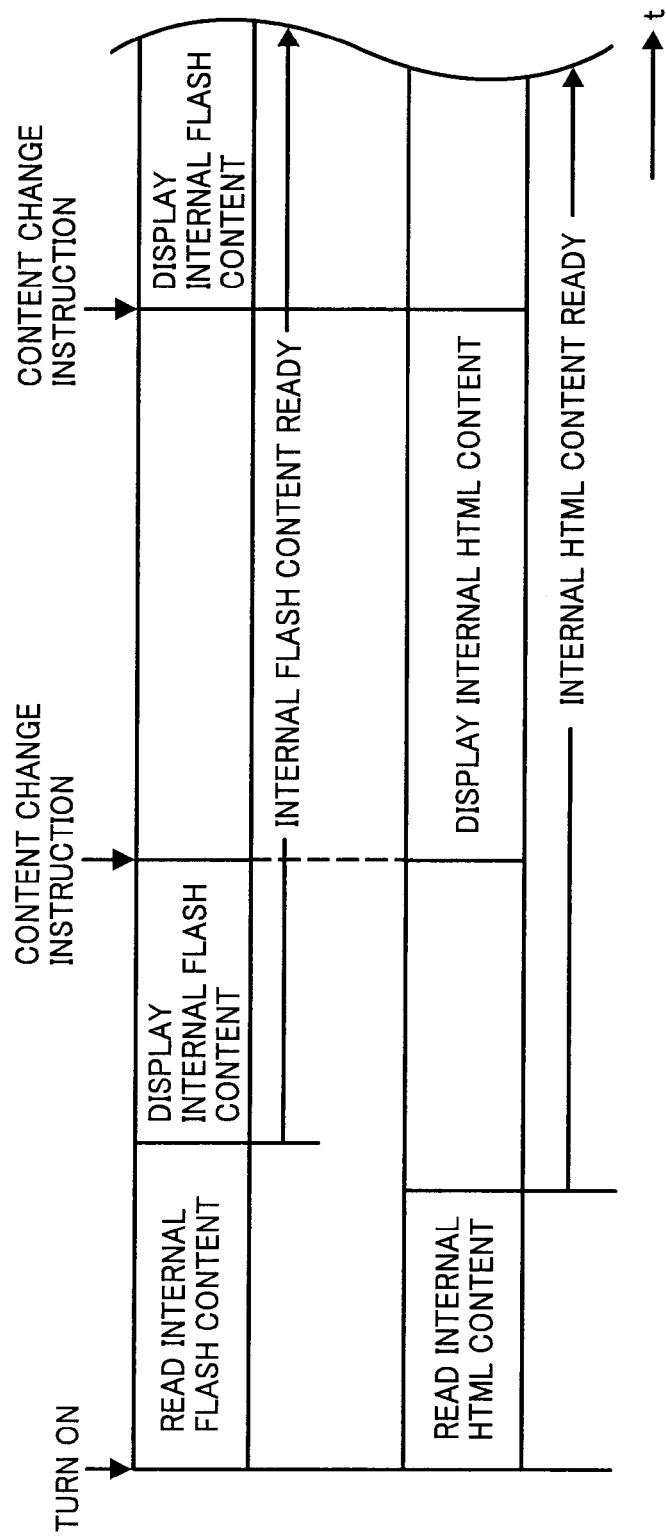
FIG. 16 is a schematic diagram for chronologically explaining the content-display process shown in FIG. 15.

FIG. 16 is a schematic diagram for chronologically explaining the process explained above with reference to FIG. 15. After the MFP 3 is turned ON, the internal flash content and the internal HTML content are read from the ROM 12a. Because the internal flash content and the internal HTML content are kept stored in the RAM 12b after being read, both the internal contents can be displayed immediately after the control unit 113 receives a content-change instruction.

As described above, because an internal HTML content is also read from the ROM 12a when the MFP 3 is turned ON and is kept stored in the RAM 12b, the time from the receipt of an content-change instruction to the display of the internal HTML content can be shortened.

Figure 17:
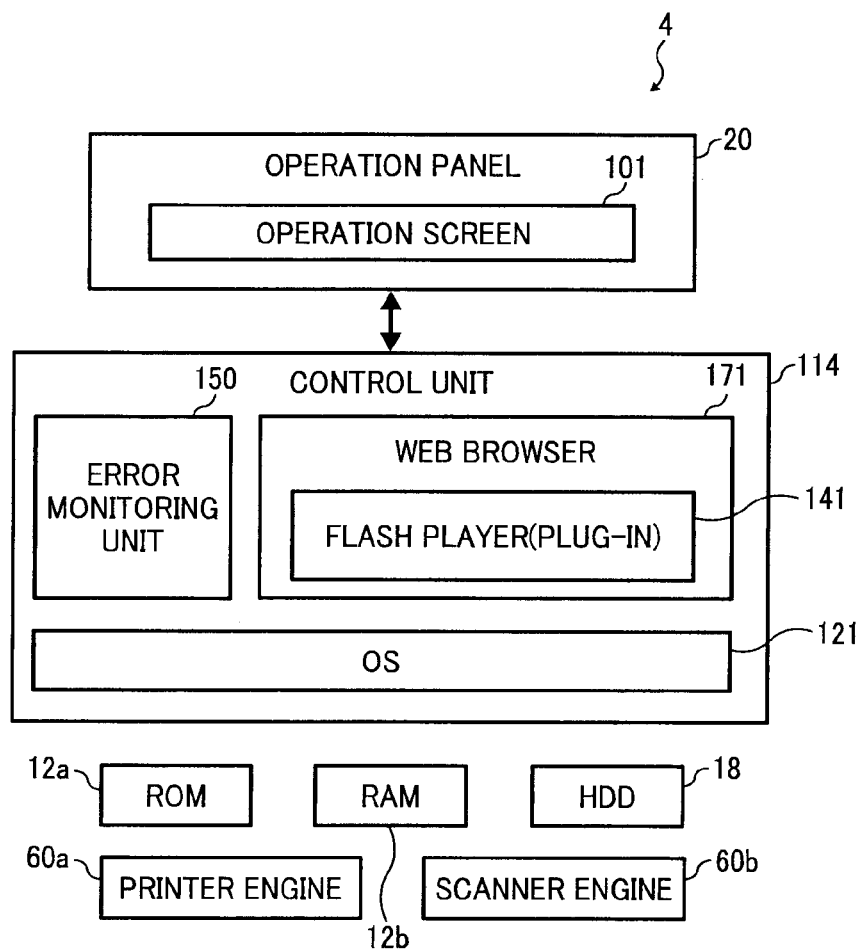
FIG. 17 is a block diagram of an image forming apparatus according to a fourth embodiment of the present invention.

FIG. 17 is a block diagram of an MFP 4 according to a fourth embodiment of the present invention. The MFP 4 is of basically the same configuration and operates in the same manner as the MFP 3 except for a control unit 114 that controls display on the operation screen 101, and therefore, the same explanation is not repeated.

The control unit 114 includes a web browser 171 in place of the web browser 133 of the control unit 113 shown in FIG. 11.

The web browser 171 generates a plurality of browser screens on the operation screen 101, and displays an HTML content (an internal HTML content or an external HTML content) on one of the browser screens. The flash player 141 displays a flash content (an internal flash content or an external flash content) on the other of the browser screens.

As just described, the web browser 171 can display a plurality of browser screens on the operation screen 101. The web browser 171 can generates the browser screens through a plurality of processes or a single process.

Figure 18:
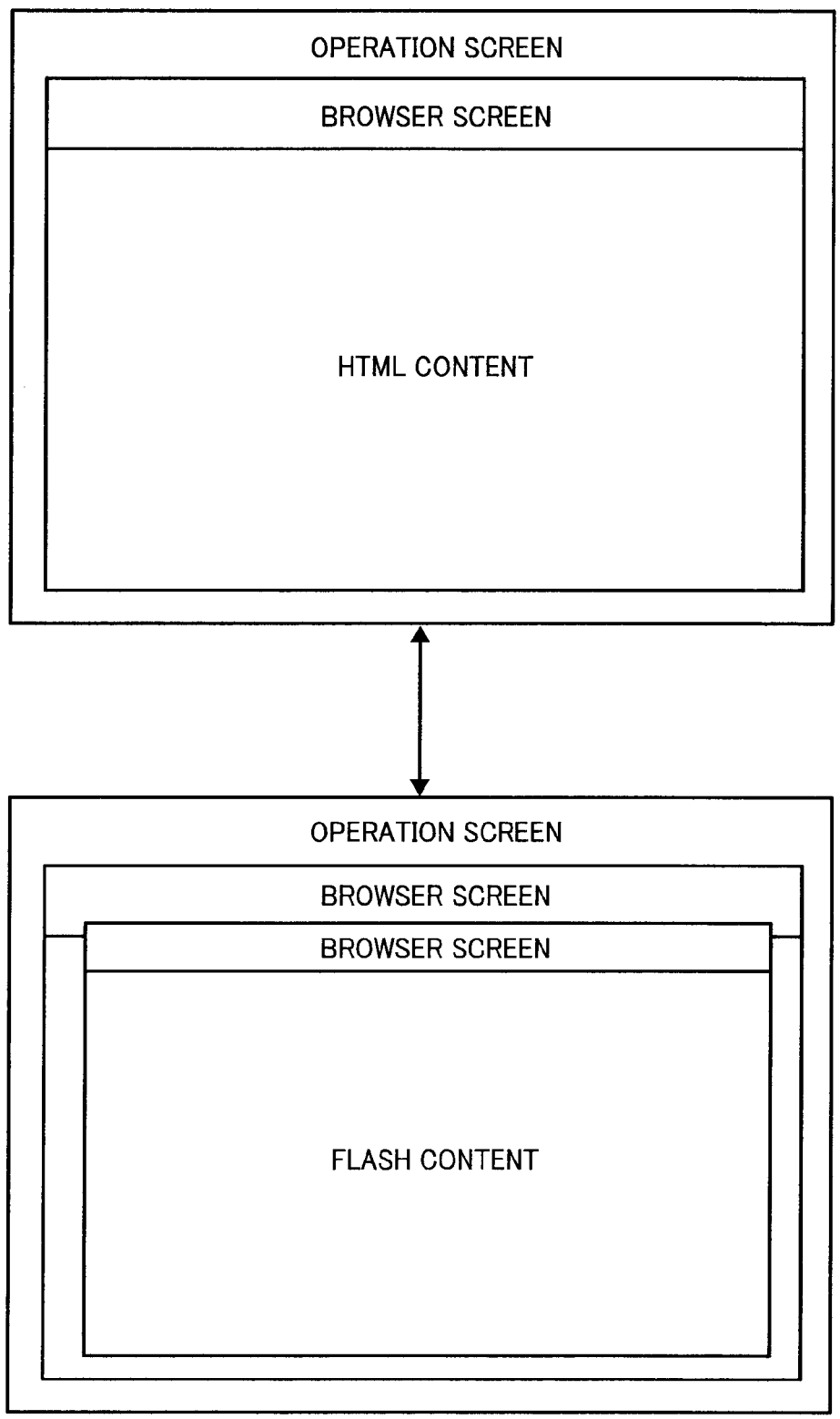
FIG. 18 is a schematic diagram of an operation screen shown in FIG. 17 for explaining transition of display thereon.

FIG. 18 is a schematic diagram for explaining an example of transition of display on the operation screen 101 controlled by the control unit 114. When the display of an HTML content is changed to the display of a flash content, the web browser 171 newly generates a browser screen on the operation screen 101, and the flash player 141 displays the flash content on the browser screen.

According to the fourth embodiment, the web browser 171 displays an internal flash content, and therefore, Cookie or JavaScript (registered trademark) can be employed for the internal flash content. For example, a user can run sessions at the same time for an internal flash content and an internal HTML content by use of Cookies.

The process performed by the MFP 4 is basically the same as previously described for the MFP 3 in connection with FIGS. 13 and 14. In other words, in the MFP 4, once being read, an internal flash content is not deleted even when an internal HTML content is displayed instead. Accordingly, the internal flash content is kept stored and can be displayed again without re-reading thereof.

As with the MFP 2, the MFP 4 can display an internal flash content as an error display after an error occurs.

Figure 19:
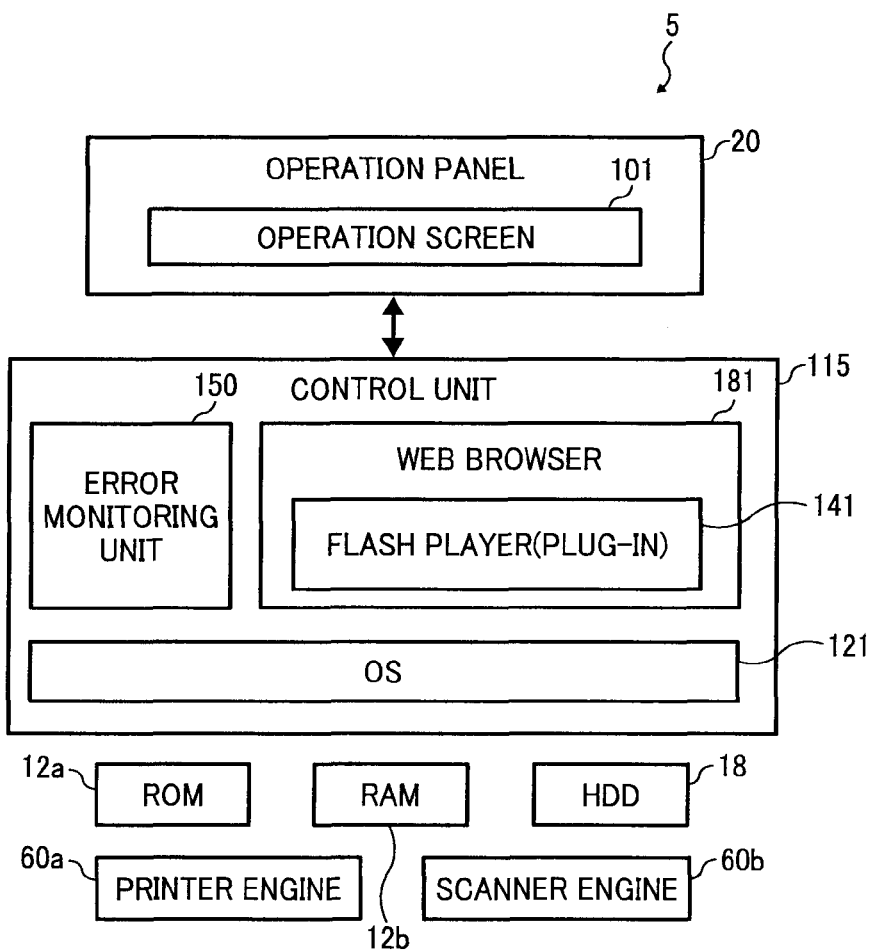
FIG. 19 is a block diagram of an image forming apparatus according to a fifth embodiment of the present invention.

FIG. 19 is a block diagram of an MFP 5 according to a fifth embodiment of the present invention. The MFP 5 is of basically the same configuration and operates in the same manner as the MFP 3 except for a control unit 115 that controls display on the operation screen 101, and therefore, the same explanation is not repeated.

The control unit 115 includes a web browser 181 in place of the web browser 133 of the control unit 113 shown in FIG. 11.

The web browser 181 generates a browser screen on the operation screen 101 and displays an HTML content (an internal HTML content or an external HTML content) on the browser screen. The flash player 141 displays a flash content (an internal flash content or an external flash content) on the browser screen.

The web browser 181 can switch a plurality of windows one to another using tabs on the browser screen generated on the operation screen 101.

Figure 20:
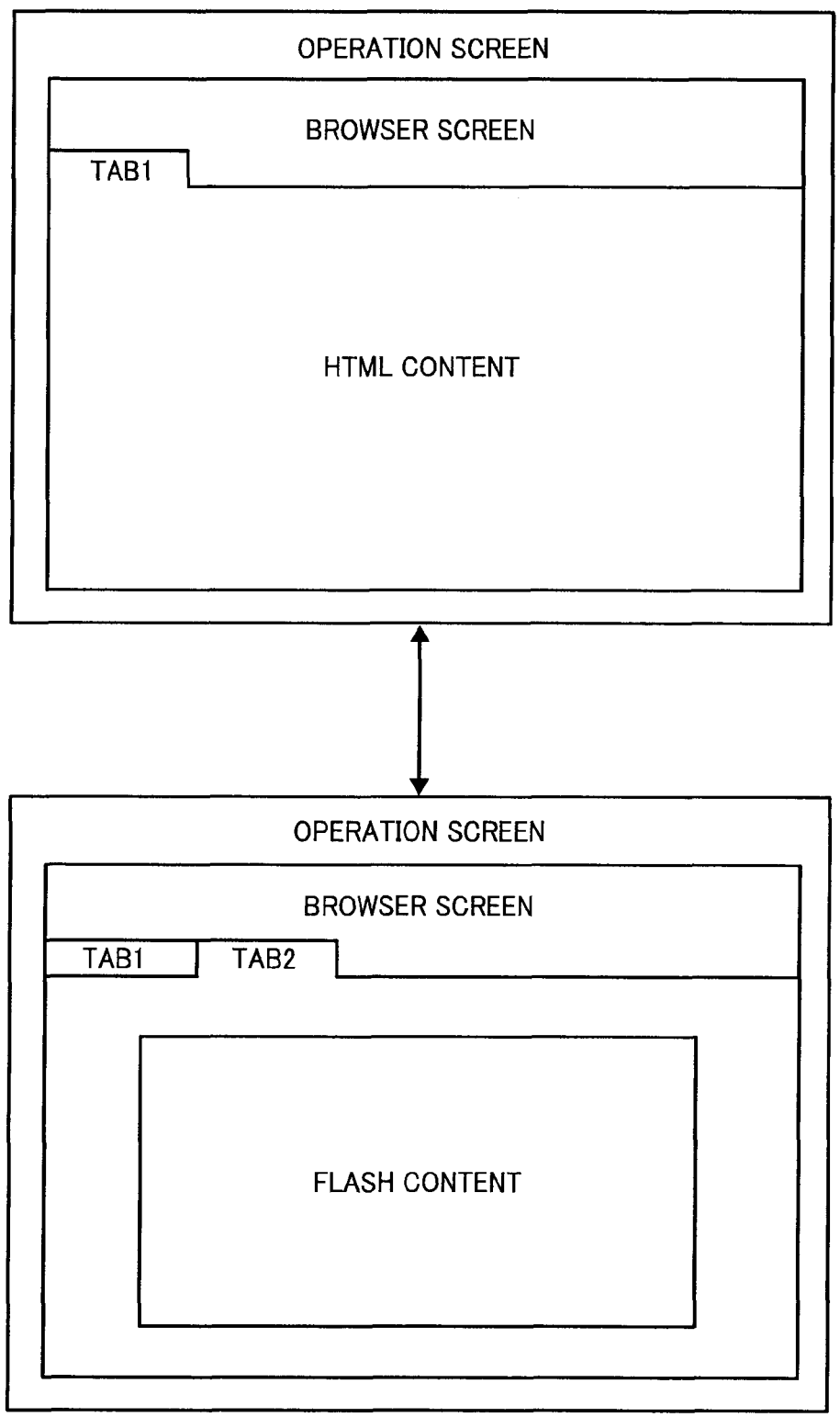
FIG. 20 is a schematic diagram of an operation screen shown in FIG. 17 for explaining transition of display thereon.

FIG. 20 is a schematic diagram for explaining an example of transition of display on the operation screen 101 controlled by the control unit 115. When the display of an HTML content on a window of a tab 1 is changed to the display of a flash content on a browser screen, the web browser 181 newly generates a window of a tab 2 on the browser screen, and the flash player 141 displays the flash content on the window of the tab 2.

Because the internal flash content and the internal HTML content are managed with a single browser screen as described above, required memory capacity can be reduced compared with the case where the internal flash content and the internal HTML content each require a browser screen.

As with the MFP 2, the MFP 5 can display an internal flash content as an error display after an error occurs.

Figure 21:
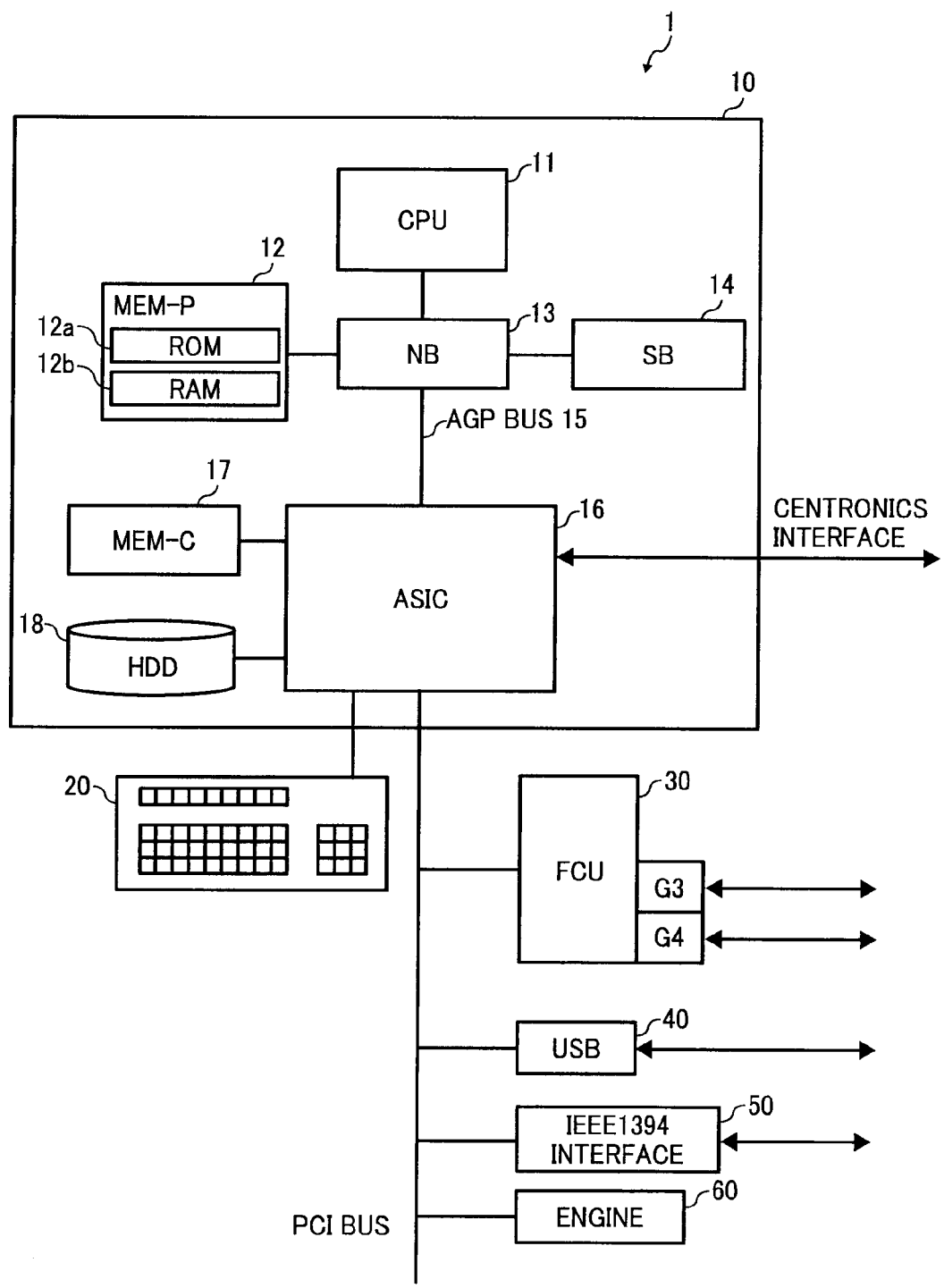
FIG. 21 is a block diagram of a hardware configuration of the image forming apparatus shown in FIG. 1.

FIG. 21 is a block diagram of a hardware configuration of the MFP 1. The MFP 1 includes a controller 10 that is connected to an engine 60 via a peripheral component interconnect (PCI) bus. The controller 10 controls the MFP 1, including image-forming, communications, and input from an operation unit (not shown in FIG. 21). The engine 60 includes the printer engine 60a and the scanner engine 60b that are connectable to the PCI bus, and is, for example, a monochrome plotter, a single-drum color plotter, a four-drum color plotter, a scanner, or a facsimile unit. The engine 60 further includes an image processing unit for error diffusion and gamma conversion in addition to the engines such as the above plotter.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and the HDD 18. The NB 13 and the ASIC 16 are connected via an accelerated graphics port (AGP) bus 15. The MEM-P 12 includes the ROM 12a and the RAM 12b.

The CPU 11 controls the MFP 1, and includes a chip set that includes the NB 13, the MEM-P 12, and the SB 14, and is connected to an other devices via the chip set.

The NB 13 functions as a bridge for connecting the CPU 11 to the MEM-P 12, the SB 14, and the AGP bus 15, and includes a memory controller that controls writing to and reading from the MEM-P 12, a peripheral component interface (PCI) master, and an accelerated graphic port (AGP) target.

The MEM-P 12 including the ROM 12a and the RAM 12b is a readable and writable system memory. The ROM 12a is used for storing a computer program or data, and the RAM 12b is a readable and writable memory that functions as a memory for loading a program and data for, for example, forming an image.

The SB 14 functions as a bridge for connecting the NB 13 to a PCI device and a peripheral device. The SB 14 is connected to the NB 13 via the PCI bus, and a network interface (I/F) is connected to the PCI bus.

The ASIC 16 is an integrated circuit (IC) that includes a hardware component for image processing, and function as a bridge for connecting the AGP bus 15, the PCI bus, the HDD 18, and the MEM-C 17. The ASIC 16 includes an arbiter (ARB) that is a core of the ASIC 16, a memory controller that controls the MEM-C 17, and a plurality of direct memory access controllers (DMAC), and an PCI unit. The DMAC controls image data such that the image is rotated by, for example, a hardware logic. The PCI unit performs data transfer via the PCI bus between the PCI unit and the engine 60. A facsimile control unit (FCU) 30, an universal serial bus (USB) 40, and the institute off electrical and electronics engineers 1394 (IEEE1394) interface 50 are connected to the ACIC 16.

The MEM-C 17 is a local memory used as an image buffer for copying and a code buffer. The HDD 18 stores therein image data, a computer program, font data, and a form.

The AGP bus 15 is a bus interface for a graphics accelerator card proposed for high-speed graphic processing. The AGP bus 15 accelerates the graphic accelerator card by directly accessing the MEM-P 12 with high throughput.

A computer program (hereinafter, "content-display program") executed on a computer to realize the same function as any one of the MFPs 1 to 5 is previously stored in the ROM 12a.

The content-display program can be provided as being recorded, in an installable or executable format, in a computer-readable recording medium, such as a compact disk read only memory (CD-ROM), a flexible disk (FD), a compact disk readable (CD-R), and a digital versatile disk.

The content-display program can also be stored in another computer connected to the computer via a network such as the Internet and downloaded therefrom via the network. In addition, programs that implements the structural components according to the first to the fifth embodiments can be provided or distributed via the network.

The content-display program includes modules including the above-described structural components (e.g., the OS, the web browser, and the flash player). The CPU 11 loads the content-display program from the ROM 12a into the main memory and executes it to implement the structural components.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    a display unit that displays an operation screen, and that receives input through the operation screen;
    a first storage unit that stores therein a markup file that contains a definition of a screen described in a markup language, and a first content that contains at least a still image;
    a browser unit that executes the markup file to create the screen on the operation screen according to the definition, and displays the screen as a second content;
    a displaying unit that displays the first content on the operation screen; and
    a control unit that controls switching of display on the operation screen between the second content and the first content, wherein
    the display unit receives an instruction through the operation screen for switching the display between the second content and the first content, and
    the control unit switches the display between the second content and the first content upon receipt of the instruction.

2. The image forming apparatus according to claim 1, wherein
    the browser unit includes the displaying unit, and
    the control unit causes the displaying unit to display the first content on the second content being displayed on the operation screen to switch the second content to the first content.

3. The image forming apparatus according to claim 2, wherein
    the browser unit creates a plurality of screens on the operation screen, and displays one of the screens as the second content, and
    the control unit causes the displaying unit to display the first content on any one of the screens other than the one of the screens being displayed as the second content to switch the second content to the first content.

4. The image forming apparatus according to claim 2, wherein
    the browser unit creates a plurality of windows on the screen, and displays the second content in one of the windows, and
    the control unit causes the displaying unit to display the first content in any one of the windows other than the one of the windows, in which the second content is being displayed, to switch the second content to the first content.

5. The image forming apparatus according to claim 1, wherein the displaying unit is independent of the browser unit.

6. The image forming apparatus according to claim 5, further comprising a second storage unit that temporarily stores therein the second content and the first content to be displayed on the operation screen, wherein
    the control unit switches the display between the second content and the first content such that any one of the second content and the first content that has been displayed on the operation screen is kept stored in the second storage unit.

7. The image forming apparatus according to claim 1, further comprising a monitoring unit that monitors whether an error has occurred, wherein
    the displaying unit displays, when the error detecting unit detects the error, a first content containing information on the error.

8. The image forming apparatus according to claim 7, wherein the displaying unit terminates the display of the first content containing the information on the error after the monitoring unit detects that the error has been corrected.

9. The image forming apparatus according to claim 1, wherein the markup file contains HTML data.

10. The image forming apparatus according to claim 1, wherein the first content contains flash data.

11. A content display method of an image forming apparatus the method comprising:
    displaying an operation screen to receive input;
    storing a markup file that contains a definition of a screen described in a markup language, and a first content that contains at least a still image;
    executing the markup file to create the screen on the operation screen according to the definition;
    displaying the screen as a second content on the operation screen;
    displaying the first content on the operation screen;
    receiving, by the image forming apparatus, an instruction through the operation screen for switching display on the operation screen between the second content and the first content; and
    switching, by the image forming apparatus, the display on the operation screen between the second content and the first content upon receipt of the instruction.

12. A computer program product comprising a non-transitory computer-readable storage medium having computer readable program codes that, when executed, causes a computer to perform a method comprising:
    creating a screen based on a markup file that contains a definition of the screen described in a markup language;
    displaying the screen as a second content on an operation screen;
    displaying a first content that contains at least a still image on the operation screen;
    receiving an instruction through the operation screen for switching display on the operation screen between the second content and the first content; and
    switching the display on the operation screen between the second content and the first content upon receipt of the instruction.

13. The computer program product according to claim 12, wherein the step of switching comprises:

displaying the first content on the second content being displayed on the operation screen to switch the second content to the first content.

14. The computer program product according to claim 13, wherein the step of switching comprises:
displaying the first content on any one of a plurality of screens on the operation screen other than the one of the screens being displayed as the second content to switch the second content to the first content.

15. The computer program product according to claim 13, wherein the step of switching comprises:
displaying the first content in any one of a plurality of windows on the screen other than the one of the windows, in which the second content is being displayed, to switch the second content to the first content.

16. The computer program product according to claim 12, wherein the step of switching comprises:
switches the display between the second content and the first content such that any one of the second content and the first content that has been displayed on the operation screen is kept stored in a second storage unit that temporarily stores therein the second content and the first content to be displayed on the operation screen.

17. The computer program product according to claim 12, further comprising:
monitoring whether an error has occurred;
displaying, when the error is monitored to have occurred, a first content containing information on the error.

18. The computer program product according to claim 17, further comprising:
terminating the display of the first content containing the information on the error after detecting that the error has been corrected.

19. The computer program product according to claim 12, wherein the markup file contains HTML data.

20. The computer program product according to claim 12, wherein the first content contains flash data.

* * * * *